United States Patent

[11] 3,563,614

| [72] | Inventor | Roby A. Parks |
| | | Springfield, Ill. |
| [21] | Appl. No. | 690,921 |
| [22] | Filed | Dec. 15, 1967 |
| [45] | Patented | Feb. 16, 1971 |
| [73] | Assignee | Allis-Chalmers Manufacturing Company |
| | | Milwaukee, Wis. |

[54] TRACK LINK WITH DRIVING LUG RELEASABLY SECURED TO TRACK SHOE
2 Claims, 6 Drawing Figs.

[52] U.S. Cl. ............................................. 305/54, 305/57
[51] Int. Cl. ....................................... B62d 55/26
[50] Field of Search .............................. 305/56, 57, 54, 52, 58, 59, 13; 74/229

[56] References Cited
UNITED STATES PATENTS

| 1,186,785 | 6/1916 | Holt | 305/14 |
| 1,339,786 | 5/1920 | Porter | 305/59x |
| 1,446,292 | 2/1923 | George | 305/57 |
| 1,513,459 | 10/1924 | Jett | 305/13 |
| 1,678,149 | 7/1928 | Lamb | 305/58x |
| 2,133,653 | 10/1938 | Bomford | 305/57x |
| 2,598,828 | 6/1952 | Phelps | 305/58x |
| 3,359,044 | 12/1967 | Boggs | 305/57 |

*Primary Examiner*—Richard J. Johnson
*Attorneys*—Charles L. Schwab, Robert B. Benson and Kenneth C. McKivett ABSTRACT: A drive lug is releasably secured to each shoe of an endless track to provide a center pitch track. The teeth of the drive sprocket engage the drive lugs instead of the track bushings. The relative velocity at which the drive lug impacts the sprocket tooth is very substantially reduced thus reducing noise and wear.

PATENTED FEB 16 1971  3,563,614

INVENTOR
Roby A. Parks

By Charles C. Schwarz
ATTORNEY 3,563,614

TRACK LINK WITH DRIVING LUG RELEASABLY SECURED TO TRACK SHOE

This invention relates to endless tracks for crawler tractors and more particularly to an improved track link wherein a drive lug is releasably secured to the track shoe intermediate the pivot connections between the links.

The conventional endless tracks used on crawler tractors employed in construction-type work are comprised of track links interconnected by pins and bushings, each link including a pair of laterally spaced and vertically disposed side bars and a shoe releasable secured to the bottom of the side bars. In such conventional type tracks the side bars have an upper rail portion with a rail surface on which the track wheels roll. Although this type of track has become accepted in the trade, it has definite shortcomings. One shortcoming is the tendency for bushings to crack due to the high impact load imposed on them by the drive sprocket. Another shortcoming is the excessive noise generated by the track during operation of the tractor. Additionally, track life has been limited by the wear of the bushings and drive sprocket due to the scrubbing action between the two during reverse operation of the crawler tractor. My invention substantially obviates these shortcomings. I add drive lugs to such tracks a center pitch characteristic while still retaining the desirable features of a side bar type track.

It is an object of this invention to provide an improved endless track having a lower noise level.

It is a further object of this invention to provide an improved endless track having increased life.

It is a further object of this invention to provide an endless track having side bars of substantial vertical height and center pitch drive lugs.

It is a further object of this invention to provide an endless track having driving lugs which may be replaced without removing the track from the tractor.

It is a further object of this invention to reduce the impact forces imposed on the sprocket and track components during operation of a crawler tractor.

These and other objects and advantages of this invention will be apparent to those familiar with the endless track mechanisms when the following description is read in conjunction with the drawings in which.

Figure 1:
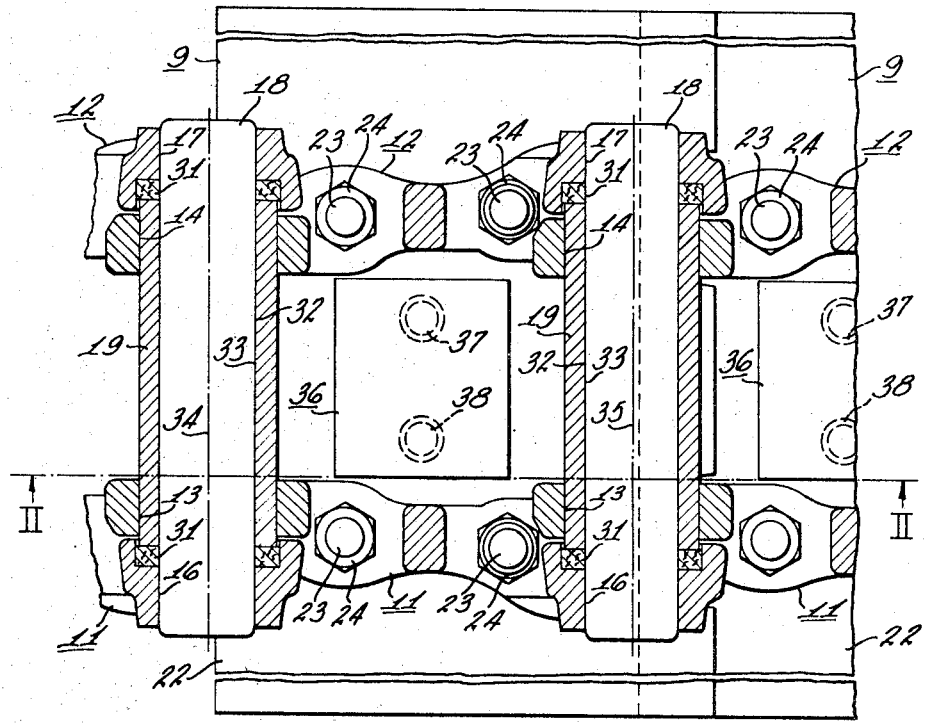
FIG. 1 is a horizontal section view of a part of an endless track incorporating the present invention taken along the line I–I in FIG. 2.
Figure 2:
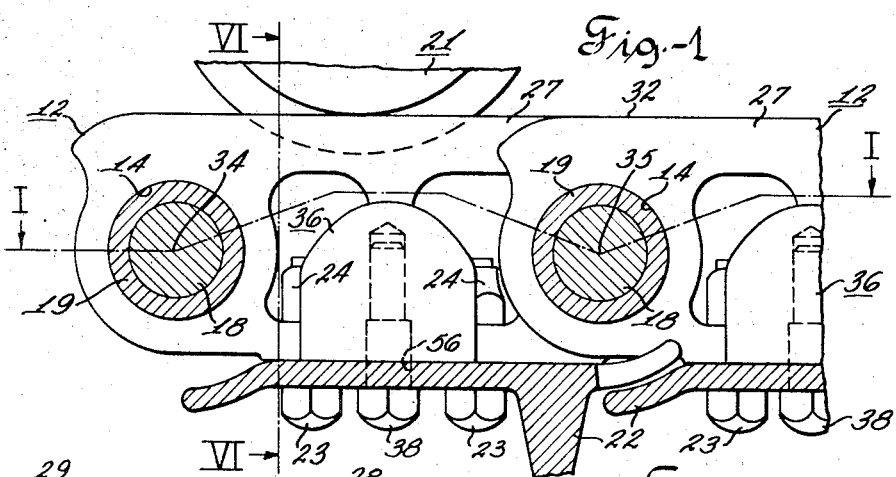
FIG. 2 is a section view taken along the line II–II in FIG. 1.
Figure 6:
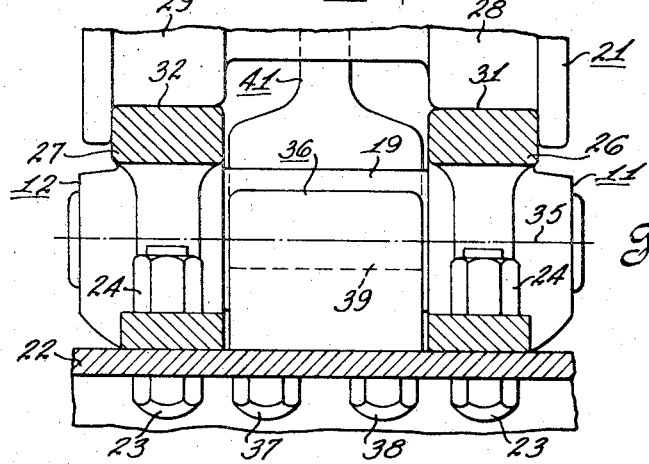
FIG. 6 is a section view taken on line VI–VI in FIG. 2.

As shown in FIG. 1 and 2 my improved endless track links 9 have a pair of laterally spaced and vertically upstanding side bars 11, 12 which present aligned bushing bores 13, 14 at their forward ends and aligned pin bores 16, 17 at their rear ends. The side bars of adjacent links are interconnected by pivot means in the form of cylindrical pins 18 and bushings 19, the ends of which are press fit in bores 13, 14, 16, 17, as shown. The two chains formed by the pivotally interconnected side bars 11, 12 provide a pair of support rails for a plurality of track rollers 21, only one of which is shown in FIG. 2. As shown in FIG. 6, the track roller 21 has a pair of rolling surfaces 28, 29 in rolling contact with the horizontal rail surfaces 31, 32 of rail portions 26, 27 of side bars 11, 12. These rail surfaces are at the uppermost part of the endless track and are thus less subject to damage from foreign particles. A track shoe 22 is releasably secured to each pair of side bars 11, 12 by bolts 23 and nuts 24.

Heretofore, it was common practice to drive the pin and bushing type endless track with a sprocket whose teeth engage bushings 19. While this type driving arrangement has been accepted by the industry for many years, it has had definite shortcomings, not the least of which is excessive wear during reverse operation due to the scrubbing action between the sprocket teeth and the bushings. The bushings have also been subject to cracking due to high impact loads occurring when they make contact with the sprocket. Heretofore, it has been a common practice to turn the pins and bushings to extend the life of the endless track. This turning of the pins and bushings was necessary to correct changes in the track pitch due to wear of the pins and bushings. The pitch is the distance between pivot axes 34, 35. The provision of appropriate seals 31 reduces the wear between the cylindrical mating surfaces 32, 33 on the pins and bushings, however, the bushing of the prior art track was still subject to external wear through its contact with the sprocket.

In the illustrated embodiment of my invention, I provide a separate replaceable drive lug 36 longitudinally intermediate the bushings 19. The drive lug 36 extends laterally substantially the entire distance between side bars 11, 12 and is releasably secured to the track shoe 22 by a pair of tension members in the form of cap screws 37, 38. This wide transverse width of the drive lug permits the use of equally wide teeth 39 on the drive sprocket 41 as is shown in FIG. 6. The drive lug is disposed within a pocket formed by the side bars 11, 12, bushings 19 and shoe 22 and thus is protected to a considerable extent.

Figure 3:
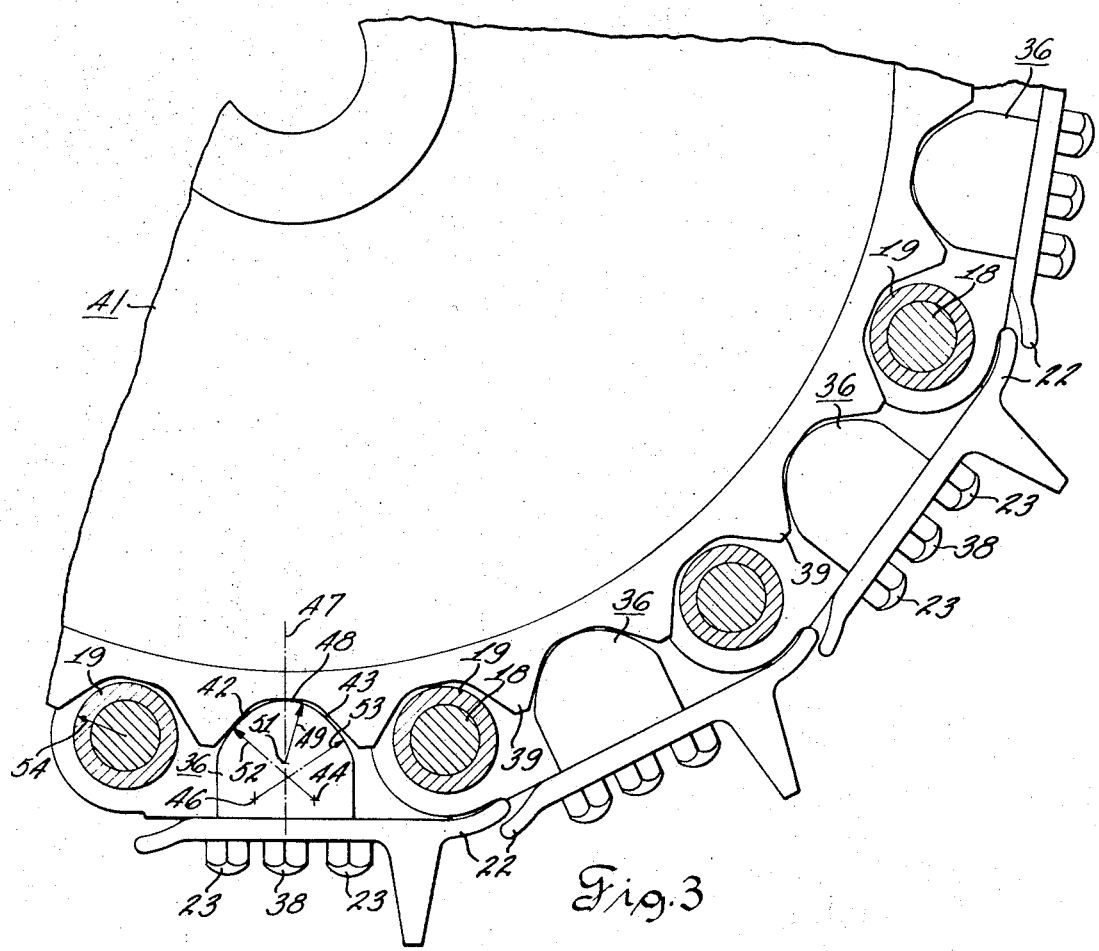
FIG. 3 is a side view of the track of this invention engaging the drive sprocket during forward movement of the tractor.

Referring also to FIG. 3 each drive lug 36 has front and rear drive surfaces 42, 43 facing in diverging directions which have equal radius convex curvatures, however, the centers 44, 46 of these arcuate surfaces 42, 43 are at opposite longitudinal sides of the central transverse vertical plane 47 through the lug. The crown 48 of the lug 36 is formed at a radius 49 whose center is at 51. It will be noted that the radii 52, 53 are grater than the radius 54 of bushing 19 whereby the surfaces 42, 43 on the lug 36 are more gradually curved than the bushing 19. Thus, the greater radius surfaces 42, 43 of lug 36 provide greater contact area for the sprocket teeth 39 than did the bushing 19 as heretofore employed. Additionally, since the lug 36 is centrally located between the longitudinal ends of the link, the relative impact velocity of the sprocket and link will be reduced by approximately 50 percent. This not only reduces wear and breakage of sprocket and track components, but also reduces the noise created by the track and sprocket during crawler tractor operation. The greater contact area between the sprocket teeth 39 and drive lugs 36 results in greater wear life of the sprocket and track components. Additionally, contributing to longer wear life is the fact that there is little or no relative movement between the lug and sprocket during either forward or reverse operation. It should be understood that the drive sprocket in FIG. 3 is at the rear of the tractor and "forward" would be movement of the tractor to the left. If some or all of the lugs 36 should require replacing, this can be achieved without removing the track from the crawler tractor. For instance, the lug 36 may conveniently be removed and replaced when it has moved to the top of the endless track loop.

An important feature of my improved endless track is the ease with which a conventional track can be converted. All that is required is the addition of lugs 36. This merely requires drilling two holes 56 in shoe 22 to provide suitable openings for cap screws 37, 38. In order to take full advantage of the improved drive contact surfaces 42, 43 provided on lugs 36, the sprocket profile should be modified to that illustrated wherein no contact is made by the sprocket with the bushings 19 and the sprocket teeth are formed to have contact with surfaces 42, 43 over a wide area.

Figures 4, 5:
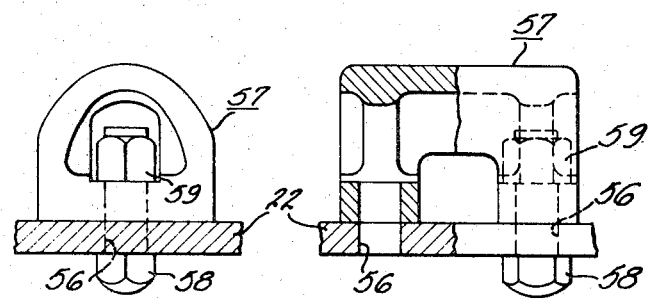
FIG. 4 is a side view of an alternate design releasable drive lug incorporating the present invention.
FIG. 5 is a side view of the drive lug shown in FIG. 4 with a part thereof shown in section.

The lug may be forged or cast as well as machined or cut from a rolled bar or extrusion. In FIGS. 4 and 5 a cast version of the lug is shown. The cast lug 57 is secured to the shoe by a pair of bolts 58 and nuts 59. In addition to reduced weight, the cast lug 57 requires little machining.

From the foregoing description, it is apparent that a greatly improved endless track has been developed. The bushing does not serve as a sprocket engaging member and thus is not subject to the usual external wear and impact forces which have a very detrimental affect on bushing service life. Since the track links wrap around the sprocket during operation by engagement at their center rather than at their ends, the relative velocity on impact of the lug with the sprocket is about half that which occurred in the conventional track with bushing-sprocket drive. This reduces wear, breakage and noise. Sprocket and track wear is also reduced by providing a broad area of contact between the sprocket teeth 39 and drive lug 36. The scrubbing action between the sprocket and track in reverse operation is eliminated.

Since this track with central drive lug has considerably longer life than prior art tracks, field replacement or modification of prior art tracks will be desired. The replacable drive lug 36 permits easy conversion of tracks on most presently existing tractors.

As will be noted in the drawings, the lug is slightly less in height than the bushings. The lug height is, however, sufficient to keep the bushings from contact with the sprocket when the track is wrapped therearound.

The embodiments of the invention in which an exclusive property or privilege is claimed are defined as follows:

I claim:

1. In an articulated endless track link assembly of the type used on a crawler tractor having a notched drive sprocket, each said link comprising: a pair of laterally spaced and vertically disposed side bars each presenting an upper rail portion, parallel pin and cylindrical bushing elements secured to and interconnecting corresponding opposite ends, respectively, of said side bars, a track shoe, connecting means releasably securing said shoe to the bottoms of said side bars, and a drive lug releasably secured to said shoe independently of said side bars and elements and disposed laterally between said side bars and intermediate the axes of said pin and bushing elements, said drive lug having front and rear convexly curved sprocket engaging surfaces facing in diverging directions and extending laterally substantially the full distance between said side bars, the top of said drive lug being of less height than said rail portions and lying substantially above the plane formed by said parallel axes, said sprocket engaging surfaces of said drive lug having centers of curvature on opposite remote sides, respectively, of the central transverse vertical plane through said lug and being more gradually curved than said bushing elements and having a size and disposition relative to said bushing elements to permit the drive lugs to be engaged by the sprocket notches prior to contact of said notches by either cylindrical bushing as each link enters the sprocket.

2. The invention of claim 1 wherein said sprocket engaging surfaces have substantially equal radii which are grater than the radius of said bushing element.